United States Patent
McMullen (10) Patent No.: US 8,723,358 B2
(45) Date of Patent: May 13, 2014

(54) LINE INTERACTIVE POWER QUALITY SYSTEM

(75) Inventor: Patrick T. McMullen, Villa Park, CA (US)

(73) Assignee: Vycon, Inc., Yorba Linda, CA (US)

( * ) Notice: Subject to any disclaimer, the term of this patent is extended or adjusted under 35 U.S.C. 154(b) by 564 days.

(21) Appl. No.: 13/174,502

(22) Filed: Jun. 30, 2011

(65) Prior Publication Data

US 2013/0002022 A1 Jan. 3, 2013

(51) Int. Cl.
*H02J 1/16* (2006.01)

(52) U.S. Cl.
USPC .......................................................... 307/47

(58) Field of Classification Search
USPC .......................................................... 307/47
See application file for complete search history.

(56) References Cited

U.S. PATENT DOCUMENTS

| | | | |
|---|---|---|---|
| 4,754,607 A | 7/1988 | Mackay | |
| 5,152,141 A | 10/1992 | Rumford et al. | |
| 5,384,792 A | 1/1995 | Hirachi | |
| 5,512,811 A | 4/1996 | Latos et al. | |
| 5,903,116 A | 5/1999 | Geis et al. | |
| 5,994,794 A | 11/1999 | Wehrlen | |
| 6,134,124 A * | 10/2000 | Jungreis et al. | 363/34 |
| 6,147,414 A | 11/2000 | McConnell et al. | |
| 6,169,390 B1 * | 1/2001 | Jungreis | 322/4 |
| 6,304,006 B1 | 10/2001 | Jungreis | |
| 6,323,625 B1 | 11/2001 | Bhargava | |
| 6,486,627 B1 | 11/2002 | Gabrys | |
| 6,657,320 B1 | 12/2003 | Andrews et al. | |
| 7,042,110 B2 * | 5/2006 | Mikhail et al. | 290/44 |
| 7,633,172 B2 | 12/2009 | Kalev et al. | |
| 7,740,092 B2 * | 6/2010 | Bender | 180/65.29 |
| 7,855,465 B2 | 12/2010 | Kalev et al. | |
| 2004/0207266 A1 | 10/2004 | Abel et al. | |
| 2007/0085421 A1 * | 4/2007 | Drubel | 307/43 |
| 2009/0302686 A1 * | 12/2009 | Fishman | 307/82 |
| 2010/0013299 A1 * | 1/2010 | Amler | 307/9.1 |
| 2010/0156189 A1 * | 6/2010 | Fishman | 307/77 |

* cited by examiner

*Primary Examiner* — Daniel Cavallari
(74) *Attorney, Agent, or Firm* — Fish & Richardson P.C.

(57) ABSTRACT

A flywheel interface system for line interactive power correction comprises a flywheel system that includes a flywheel coupled to rotate with a motor/generator. A passive rectifier is coupled to the flywheel system for converting alternating current generated by the flywheel system to direct current. An active inverter is coupled to the passive rectifier for converting the direct current from the passive rectifier to alternating current and to output the alternating current to the load. A motor drive is coupled to the motor/generator of the flywheel system for driving the motor/generator to rotate the flywheel, the motor drive including a second passive rectifier coupled to a second active inverter.

19 Claims, 5 Drawing Sheets

LINE INTERACTIVE POWER QUALITY SYSTEM

BACKGROUND

An uninterruptible power supply (UPS) system can be implemented to ensure constant power supply to a load even when an input power source fails. To accommodate the power requirement of certain loads, such as loads with high power requirements, a UPS system with energy storage, such as a battery or flywheel (shown in FIG. 1), can be employed to bridge the time between grid power loss and generator start-up. A battery system offers lower cost and higher energy density, but is unregulated and limited in life, in addition to having reliability issues. A flywheel system offers adequate energy to bridge the power for a generator start, while offering long operating life and high reliability. The flywheel system interfaces with the input power source, or power grid (e.g., a plant wide, citywide, statewide and/or nationwide utilities power transmission grid), and the load. The electrical power supplied by the flywheel system may need to be converted to meet the power quality requirements of the load. An interface that provides the required power conversion components may be costly.

Figure 2:
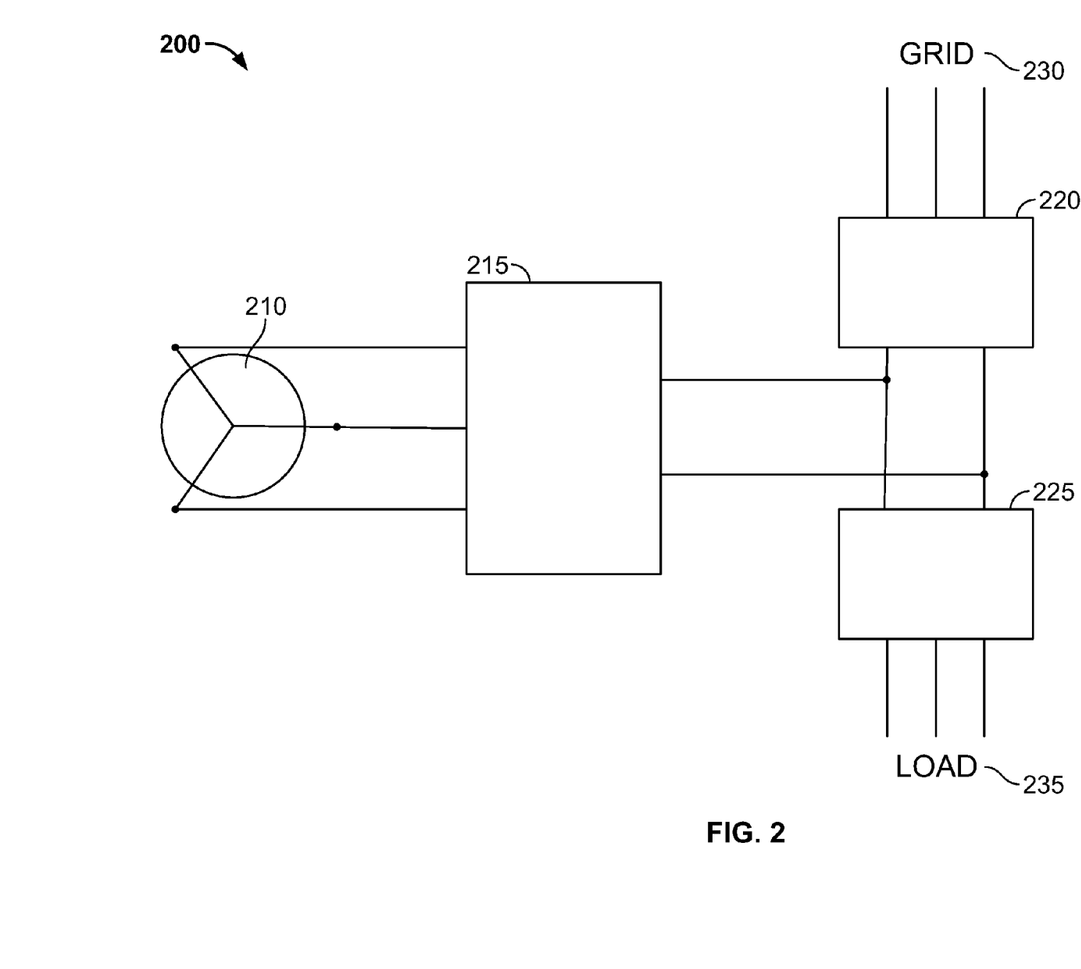
FIG. 2 is a diagram of components used in an interface between a flywheel system and a power grid.

For example, FIG. 2 depicts an example configuration 200 of components used in an interface between a flywheel motor/generator system 210 and a power grid 230 and load 235. In the illustrated example, the flywheel system 210 interfaces on the direct current (DC) bus 240 of a dual conversion UPS system. A passive rectifier 220 of the UPS converts incoming alternating current (AC) from a power source, such as power grid 230, into direct current. An active inverter 225 is used to convert the direct current from the passive rectifier 220 back into alternating current to power the load 235. For the flywheel system, an active bidirectional converter 215 is used to both (1) convert DC from the passive rectifier 220 into alternating current to power the motor/generator of the flywheel system 210, and (2) convert AC from the flywheel system 210 to DC to power the load when the power source 230 is not available. The power conversion components 215 and 225 illustrated in FIG. 2 all carry full rated power of the input rectifier 220 and must have a full load power rating. Such full power active components are typically expensive. In addition, the bidirectional converter must have very high switching frequency to minimize flywheel losses, thus making it even more costly.

Figure 3:
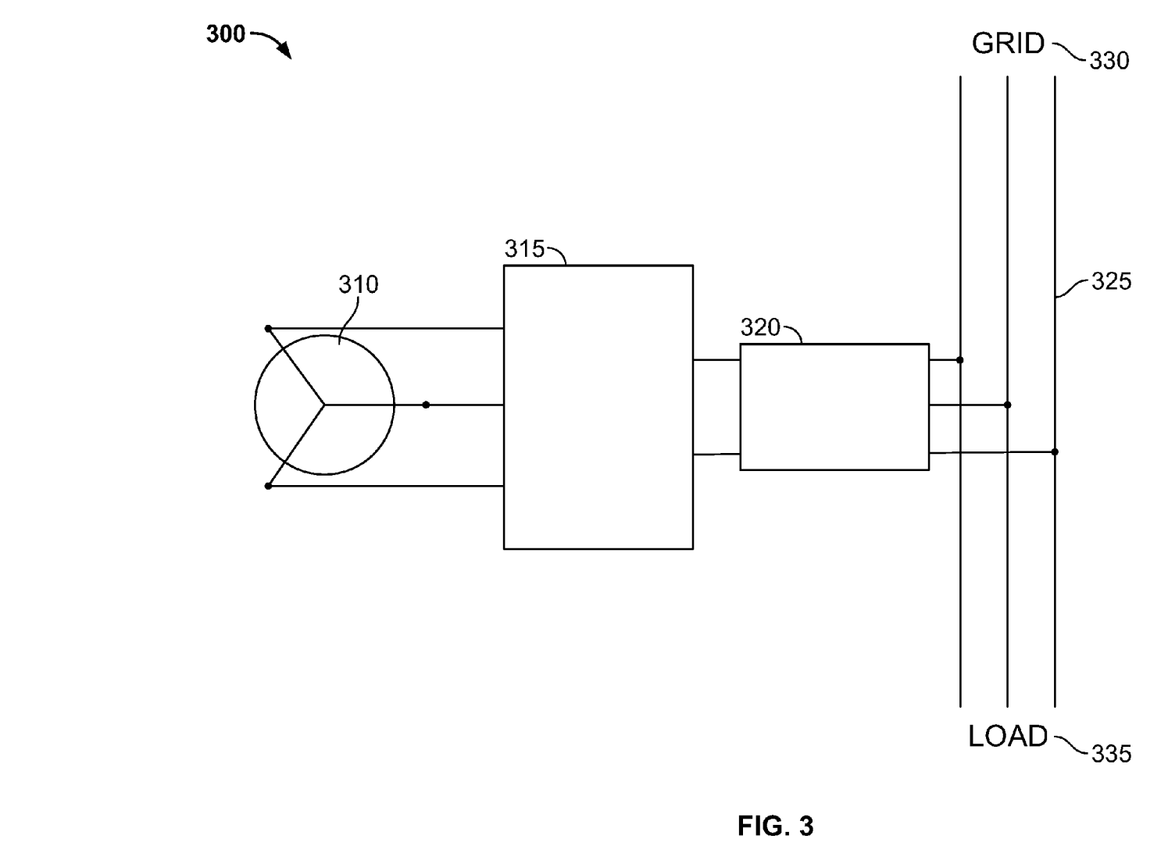
FIG. 3 is a diagram of components used in an interface between a flywheel system and a power grid.

FIG. 3 depicts another example configuration 300 of components used in an interface between a flywheel motor/generator system 310 and a power grid 330 and load 335. An active inverter 320 coupled to an active bi-directional converter 315 provides the interface between the flywheel system 310 and the power grid 330 and load 335. Here, the active inverter 320 and active converter 315 carry full power from the power grid 330 and must have a full load power rating. Again, such full power components are typically expensive.

SUMMARY

In one aspect, the disclosure encompasses a system for providing power to a load, where the load is powered by a power source. The system comprises a flywheel system including a flywheel coupled to rotate with a motor/generator. A passive rectifier is coupled to the flywheel system for converting alternating current generated by the flywheel system to direct current. An active inverter is coupled to the passive rectifier for converting the direct current from the passive rectifier to alternating current and to output the alternating current to the load. A motor drive is coupled to the motor/generator of the flywheel system for driving the motor/generator to rotate the flywheel, the motor drive including a second passive rectifier coupled to a second active inverter.

The concepts above can include one or more, or none, of the following features. The motor drive has a power rating that is less than a power rating of the passive rectifier and less than a power rating of the active inverter. A maximum power that the motor drive is configured to handle is less than the power of the power source. The motor drive is coupled to receive power from the power source. The motor drive is coupled to an alternating current bus of the power source that is configured for alternating current at a first frequency and the motor drive is configured to output alternating current at a second, variable frequency to the flywheel system. The active inverter is configured for a maximum switching frequency that is lower than a maximum switching frequency of the motor drive. The motor/generator includes a winding coupled to the motor drive for driving the motor/generator and coupled to the passive rectifier for providing power to the passive rectifier. A voltage associated with an output of the flywheel system varies based on a rotational speed of the motor/generator and the passive rectifier is coupled to receive the variable voltage output from the flywheel system. The power source is a three-phase power grid and the active inverter is configured to output alternating current having a frequency of the alternating current on the power grid. The motor/generator comprises a rotor having permanent magnets.

In a further aspect, the disclosure encompasses a method for providing power to a load. Alternating current is supplied to a flywheel system to charge a flywheel in the flywheel system, the alternating current supplied from a motor drive coupled to the flywheel system. Alternating current is output from the flywheel system to a passive rectifier during a discharge phase of the flywheel, the passive rectifier coupled to the flywheel system. The alternating current from the flywheel system is converted to direct current at the passive rectifier. The direct current from the passive rectifier is converted to alternating current at an active inverter coupled to the passive rectifier. A load is supplied with the alternating current from the active inverter.

The concepts above can include one or more, or none, of the following features. The motor drive includes a second passive rectifier coupled to a second active inverter. Supplying alternating current to a flywheel system comprises supplying alternating current to a flywheel system at a variable frequency where the highest frequency of the variable frequency is higher than a highest frequency that the active inverter is configured to supply. Supplying a load with alternating current from an active inverter comprises supplying the load at a maximum power greater than a maximum power that the motor drive is configured to handle. The discharge phase of the flywheel is initiated in response to a change in quality of power supplied to the load by a power grid. The change in quality of power is a change in at least one of a frequency of the power supplied by the power grid, a power level of the power supplied by the power grid, a voltage of the power supplied by the power grid, or a phase associated with the power supplied by the power grid.

In a further aspect, the disclosure encompasses a flywheel interface system for line interactive power correction. The system comprises a flywheel system including a flywheel and a permanent magnet motor/generator. A passive rectifier is coupled to the flywheel system for converting alternating current from the flywheel system to direct current, the passive rectifier associated with a first power rating. An active inverter is coupled to the passive rectifier for converting the direct current from the passive rectifier to alternating current, the alternating current to be supplied to a load, the active inverter associated with a second power rating. A motor drive is coupled to the motor/generator of the flywheel system for driving the motor/generator to rotate the flywheel, the motor drive including a second passive rectifier coupled to a second active inverter, the motor drive associated with a third power rating less than the first or second power rating.

The concepts above can include one or more, or none, of the following features. The third power rating is less than half the first or second power rating. A voltage output by the flywheel system varies based on a speed of the motor/generator and the passive rectifier is coupled to the flywheel system to receive the varying voltage and output direct current that varies based on the varying voltage received by the passive rectifier. The output of the flywheel system is converted into an alternating current by the passive rectifier in combination with the active inverter, the alternating current having a frequency substantially similar to a frequency associated with a previous alternating current of a power grid used to supply power to the load.

DETAILED DESCRIPTION

Figure 1:
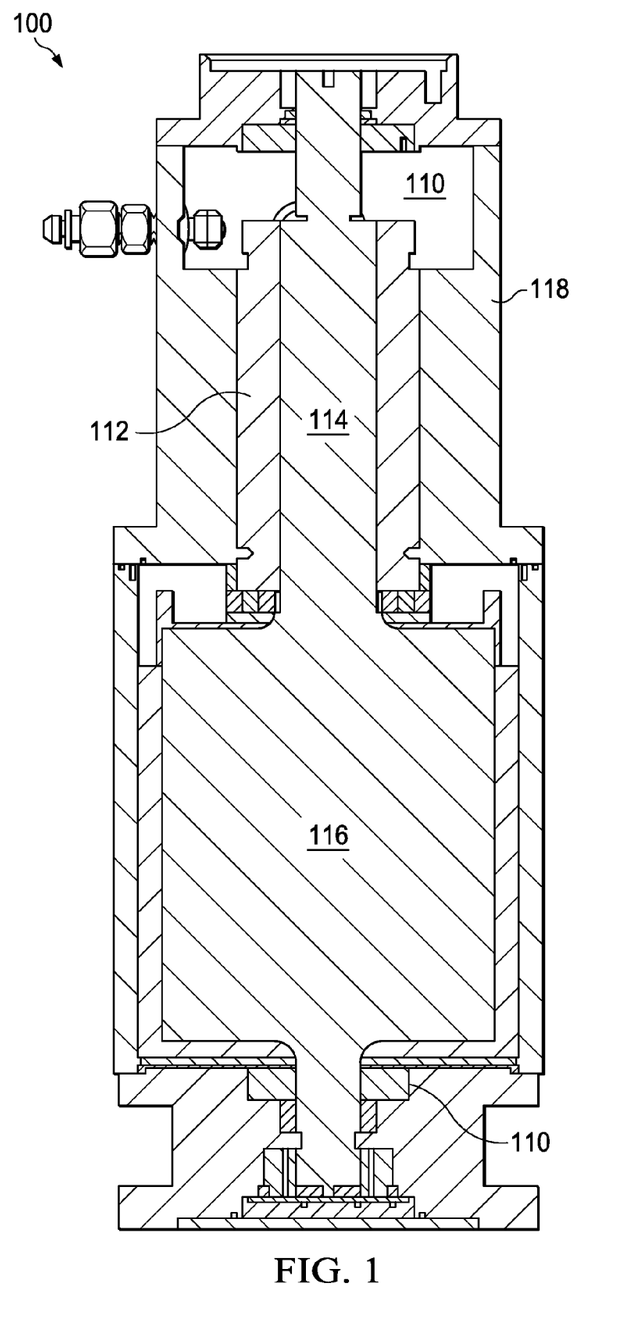
FIG. 1 is a perspective cross-sectional view of an example flywheel system.

FIG. 1 depicts an example flywheel system 100 used for energy storage in an uninterruptible power supply (UPS) system. The flywheel may be configured to store kinetic energy in the form of a rotating mass accelerated to a very high speed, and the energy is extracted as electrical energy as the flywheel slows down during a discharge phase. As illustrated in FIG. 1, the flywheel system 100 includes a flywheel 116 coupled to a rotor 114. The flywheel 116 and rotor 114 store rotational energy. In certain instances, the flywheel 116 and rotor 114 are coupled to rotate at the same speed. Further, the flywheel 116 and rotor 114 can be coupled directly without a gearbox. The flywheel 116 and rotor 114 are contained in a housing unit 118. In some implementations, the housing unit 118 provides a vacuum environment, thus reducing aerodynamic drag on the rotor 114 and flywheel 116 for increased efficiency of the flywheel system 100.

The rotor 114 may include permanent magnets, and the flywheel system 100 may also include a stator 112 that includes a plurality of formed or cable windings about a core. The rotor 114 and the stator 112, in combination, comprise parts of a high speed permanent magnet (PM) motor/generator. In certain implementations, magnetic bearings 110 (axial and/or thrust) are included in the flywheel system 100 to levitate and sustain the rotor 114 during operation of the flywheel system 100.

As described above, the flywheel system 100 includes an alternating current (AC), synchronous, permanent magnet (PM) electric machine having a rotor 114 that includes permanent magnets and stator 112 that includes a plurality of formed or cable windings about a core. In other instances, the electric machine can be another type of electric machine, such as an AC, asynchronous, induction machine where both the rotor 114 and the stator 112 include windings or another type of electric machine. The electric machine can operate as a motor producing mechanical movement from electricity, operate as a generator, producing electrical power from mechanical movement, or alternate between generating electrical power and motoring. For example, in the flywheel system 100 of FIG. 1, the electric machine operates as a motor by drawing electricity from a power source (e.g., power grid) to drive the rotor 114 and flywheel 116 to charge, or absorb, rotational energy in the flywheel. During a discharge phase, the electric machine operates as a generator in which the rotational energy of the rotor 114 and flywheel 116 drive the generator which, in response, creates electricity that is transmitted back into the power grid for driving other loads.

While FIG. 1 illustrates a vertically-oriented flywheel system 100, other implementations may provide for a horizontally-oriented flywheel system coupled to and capable of driving a flywheel hub 116, as well as yet other orientations of the flywheel system 100.

Figure 4:
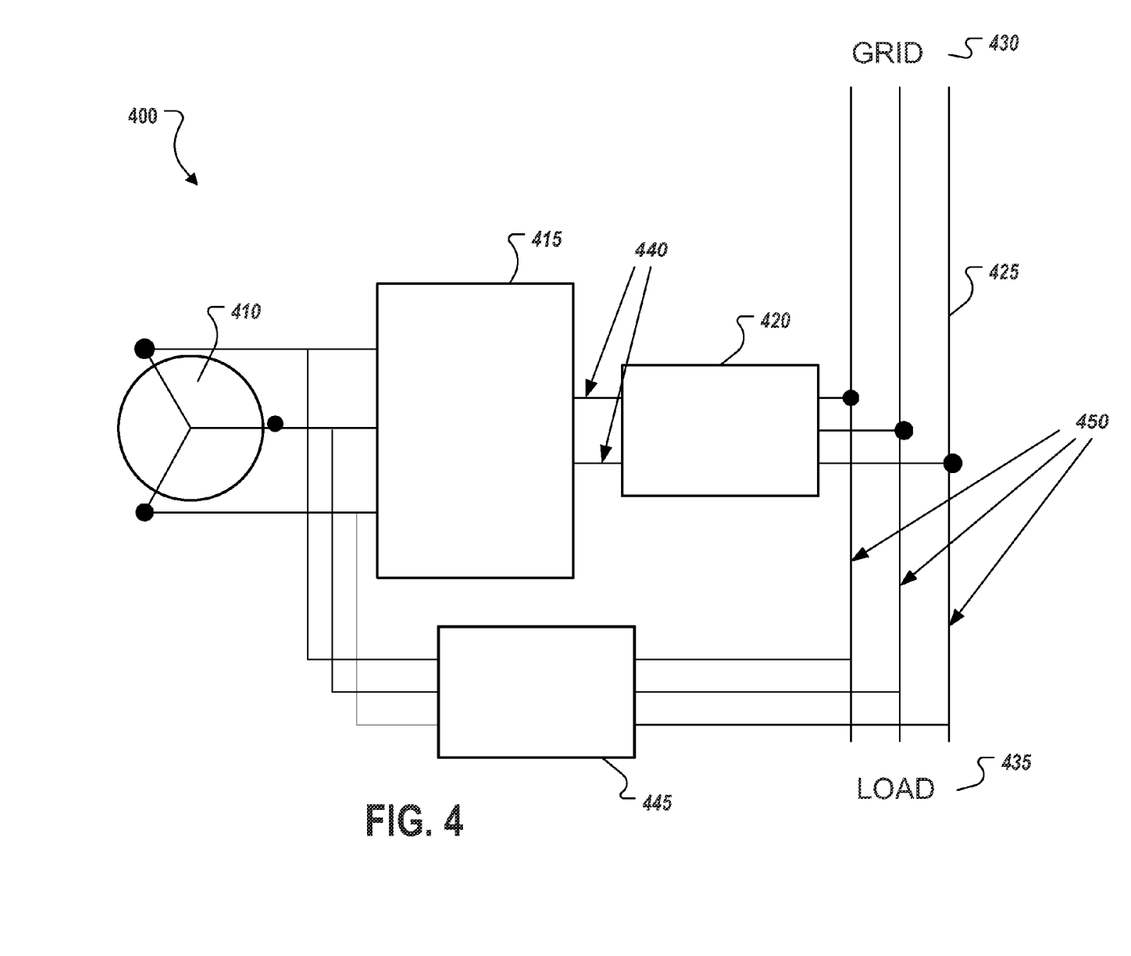
FIG. 4 is a diagram of components used in an interface between a flywheel system and a power grid.

FIG. 4 depicts an example configuration 400 of components used in an interface between a flywheel system 410 and a power grid 430 and load 435. In certain instances, the flywheel system 100 in FIG. 1 can be used as the flywheel system 410 in the example configuration 400 of FIG. 4. The circuit illustrated in FIG. 4 is configured to optimize a line interactive system with a permanent magnet generator voltage for variable DC applications. Although the frequency and voltage output from the permanent magnet generator in the flywheel system 410 may vary depending on the speed of the flywheel and the load, the conversion components illustrated in FIG. 4 may be used to control power output to a line interactive system and the load on the power grid 430. For example, the conversion components can provide AC power to a load with a particular fixed frequency despite variations in output voltage from the flywheel system 410. In certain instances, the conversion components may also allow control of power to the flywheel system 410, for example, to control the speed of the flywheel.

As illustrated in FIG. 4, the output of the flywheel system 410 is coupled to the input of a passive rectifier 415 along three paths. The three paths correspond to each phase of three-phase alternating current output from the flywheel system 410, though more phases can be envisioned to accomplish the same task. The output of the passive rectifier 415 is coupled to the input of an active inverter 420 along two paths, which comprise a DC bus 440. The two paths correspond to the positive and negative wires of the DC bus 440 required for transporting the direct current output from the passive rectifier 415 into the active inverter 420. The output of the active inverter 420 is coupled to an AC bus 450 of a power grid 430 along three paths, where each path is connected to one of three wires of the AC bus 450. Each wire of the AC bus 450 corresponds to one of three phases of three-phase power supplied by the power grid 430 and carried along the AC bus 450 to a load 435. The load 435 is also coupled to the three wires of the AC bus 450 in order to receive the three-phase power output of the power grid 430 or from the flywheel system 410. The active inverter 420 utilizes devices that switch at ten to fifty times the frequency of the AC bus frequency 450 in order to create a smooth AC waveform. In a sixty hertz AC bus system, this can be on the order of two thousand hertz to achieve a smooth waveform.

A motor drive 445 is coupled to the AC bus 450. Three wires from the AC bus 450 are connected to the input of the motor drive 445. Each of the three wires is connected to one of the three AC bus 450 wires carrying the three-phase power supply from the power grid 430. The output of the motor drive 445 is coupled to the input of the flywheel system 410 along three paths, with the three paths corresponding to the three-phase alternating current output of the motor drive 445 to drive the flywheel system 410. The motor drive 445 utilizes devices that switch at 10 to 50 times the maximum AC voltage frequency to be produced by the drive to produce a smooth waveform with minimum rotor losses in the flywheel 410. With the flywheel spinning at high speed this can be as high as fifteen thousand hertz.

In operation, power from the grid 430 is used to power the motor/generator of the flywheel system 410 to rotate the flywheel. The flywheel system 410, thus, stores energy via the flywheel's rotation. If power is needed from the flywheel system 410 to supply the load 435, such as during poor power conditions (e.g., low voltage on one or more or all of the phases, and/or intermittent power) and/or a power outage from the power grid 430, the rotational energy stored by the flywheel drives the motor/generator to generate alternating current. The flywheel and motor/generator of the flywheel system 410 are configured to provide power for at least a specified backup time period, after which the rotational energy of the flywheel has dissipated to a level that the flywheel system 410 cannot produce the required power. In certain instances, the specified backup time period is selected to outlast expected poor power conditions and/or allow enough time to engage a generator configured as longer term power source (e.g., a combustion driven generator).

When the flywheel system 410 is outputting power to the load 435, a passive rectifier 415 is used to convert alternating current, typically (though not necessarily) higher than the power grid 430 frequency, from the flywheel system 410 to direct current. The passive rectifier 415 is configured and rated to handle the full power output by the flywheel system 410, which at its peak is at least the power provided by the grid 430 and/or the power required by the load 435. In certain implementations, the output from the motor/generator of the flywheel system 410 is not regulated, and the direct current is allowed to vary in voltage depending on the speed of the flywheel system 410, for example, as the flywheel rotational speed slows. Configuring the system to accommodate a varying voltage eliminates the cost of power electronics that would otherwise be needed to produce a regulated voltage. In certain instances, the motor/generator of the flywheel system 410 can be configured to output a voltage that is higher than or lower than the voltage of the power grid 430 and/or required by the load 435 during the specified backup time period. In one example, the flywheel system 410 can be configured to generate 540-270 volts on the DC bus 440 during the backup time period for a power grid or load that requires 220 volts, or configured to generate 440-220 volts on the DC bus 440 during the backup time period for a power grid or load that requires 480 volts. In yet other instances, the output of the flywheel system 410 can be regulated to provide a steady voltage on the DC bus 440.

The direct current produced by the flywheel system 410 via the passive rectifier 415 during discharge can then be inverted to alternating current by an active inverter 420. The resulting alternating current is then provided to the load 435. In certain instances, the active inverter 420 can be driven to match the frequency of its output alternating current to the frequency of the power grid 430 and/or the requirements of the load 435. The active inverter 420 is configured and rated to handle the full power output by the flywheel system 410, which at its peak is at least the power provided by the grid 430 and/or the power required by the load 435. In some instances, adequate capacitance and inductance is provided as needed on the DC bus 440 and AC bus 425 to filter small fluctuations in the input or output of the inverter 420 without engaging the flywheel of the flywheel system 410.

A variable speed motor drive 445 is included in the configuration 400 to charge and maintain the speed of the flywheel in the flywheel system 410. In some implementations, the motor drive 445 is a separate low power AC drive that takes power from the AC bus 450. Additionally or alternatively, the motor drive 445 can take power from another source. The motor drive 445 may include a passive rectifier directly coupled to an active inverter for converting power obtained from the alternating current of the power grid 430 to the frequency used to drive the flywheel system 410. In some instances, the full power from the power grid 430 is not needed to drive the flywheel system 410. In such instances, the maximum power that the motor drive 445 is configured and rated for is lower than the power from the grid 430 and/or the passive rectifier 415 and active inverter 420. It is expected that for a typical UPS application this motor drive 415 power required to charge the flywheel system 410 is three percent to five percent of the rated power of the flywheel system 410.

The motor drive 445 can be configured to power the same winding of the motor/generator of the flywheel system 410 used in generating power. In other instances, an additional, dedicated drive winding can be provided in the motor/generator of the flywheel system 410 and the motor drive 445 can be configured to power the drive winding. For example, the motor/generator of the flywheel system 410 can have windings similar to a motor/generator configured for six-phase power, where three of the phase windings are coupled to the motor drive 445 and three of the phase windings are coupled to the passive rectifier 415 and active inverter 420. In yet other instances, the motor drive 445 can be coupled to drive an alternate motor (not shown) coupled to rotate the flywheel of the flywheel system 410.

In certain instances, a controller is used to monitor the alternating current supplied by the power grid 430 for any potential problems, maintain the flywheel system 410 in a charged state using the motor drive 445, and switch the power source to the flywheel system 410 between the motor drive 445 and the motor/generator output via the inverter 420.

The configuration illustrated in FIG. 4 provides a low cost approach to converting the flywheel system 410 to interface with the power grid 430 directly for a power quality and line interactive power correction system. For example, the output frequency used to drive the flywheel system 410 may be a variable frequency and is typically (though not necessarily) much higher, on the order of 5 to 10 times higher, than the frequency of the grid 430 and/or load 435. The flywheel system 410 may be supplied with a variable frequency, where the highest frequency of the variable frequency is higher than the highest output frequency that the active inverter 420 is configured to supply. The motor drive 445 of FIG. 4 may be configured to supply the variable frequency having the maximum output frequency required by the flywheel system 410.

To achieve this higher output frequency, the devices used in the motor drive 445 may be required to switch at a much higher frequency (i.e., switching frequency or carrier frequency) to achieve a smoother (i.e., higher resolution) output frequency waveform. The switching frequency of the devices that produce this output for driving the flywheel are much higher, on the order of 5 to 10 times higher, than the switching frequency of the devices used to produce the frequency required for the grid 430 and/or load 435. This is required to minimize rotor losses in the flywheel system 410. In certain instances, because the active inverter 420 need not be configured to produce the high frequencies needed to drive the motor/generator, the active inverter 420 can be configured for a lower maximum switching frequency. In other words, the highest switching frequency that the active inverter 420 is capable of can be lower than the highest switching frequency of the motor drive 455, which means a lower cost associated with the active inverter 420.

The difference in cost may be based in part on the switching devices used in power devices. The switching devices used for high power devices are less efficient, i.e. generate higher losses, when they are switched at higher frequency. Accordingly, for equivalent power output, larger switching devices are needed to accommodate the higher losses that result from higher frequency switching device applications, increasing costs. An active inverter 420 with a lower maximum switching frequency, and lower cost, may be used in the configuration of FIG. 4 because the active inverter 420 is not needed to drive the motor/generator.

Similarly, in certain instances, the motor drive 445 (and the active inverter circuit therein) can be a drive with a high maximum switching frequency, but need not be configured or rated for the full power of the grid 430, load 435 and/or the peak output of the flywheel system 410. Thus, in certain instances, the motor drive 445 may be smaller and less expensive than an active converter, such as the active bi-directional converter 315 described in relation to FIG. 3. For example, in certain instances, the motor drive 445 may have a power rating that is five percent (or less) of the power ratings of the passive rectifier 415 or the active inverter 420.

Figure 5:
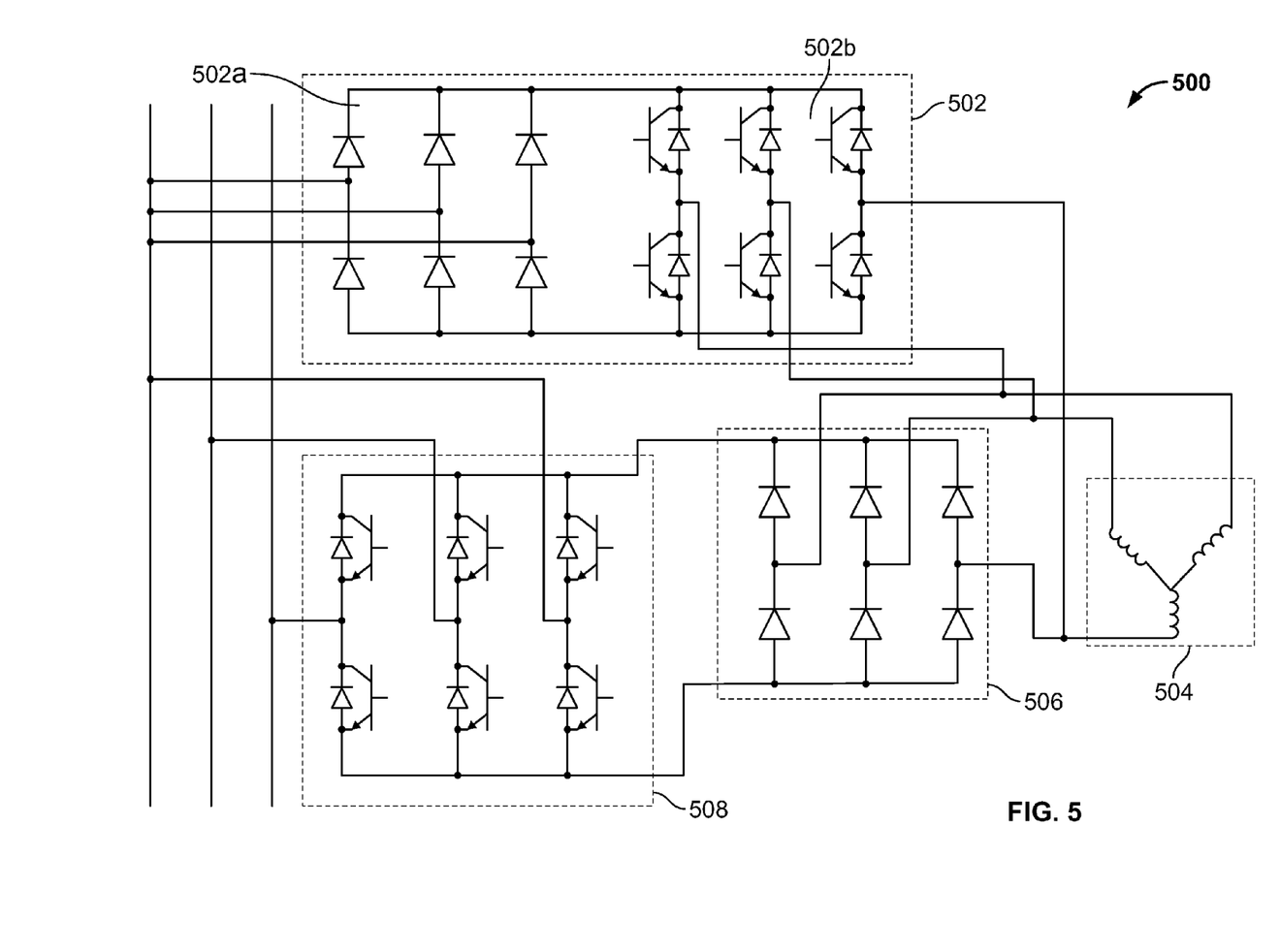
FIG. 5 is a circuit diagram of power electronic components used to implement the components described in FIG. 4.

FIG. 5 depicts an example circuit diagram 500 of power electronic components used to implement the power conversion units described in relation to FIG. 4. The passive rectifier 415 of FIG. 4 for rectifying current from the flywheel system 410 is represented in circuit 506, and the active inverter 420 of FIG. 4 for providing AC power to an external load is represented in circuit 508. As illustrated in FIG. 5, the passive rectifier 415 includes multiple diodes and the active inverter 420 includes a combination of transistors and diodes. In some implementations, insulated gate bipolar transistors (IGBT) are used for the transistors depicted in FIG. 5. The motor drive 445 may include a circuit 502 comprised of a passive rectifier component 502*a* and an active inverter component 502*b* for quality control of power out of the motor drive 445 into the flywheel system 410. The flywheel system 410 may be represented as circuit 504. The components illustrated in FIG. 5 are configured for generating and converting three-phase power, although systems and components configured for different power phases (e.g., 1, 2, 6 and/or other phases) are also within the scope of the present disclosure. Further, the power conversion units described in FIG. 4 may be implemented using different components or circuitry other than the components depicted in FIG. 5.

A number of embodiments have been described. Nevertheless, it will be understood that various modifications may be made. Accordingly, other embodiments are within the scope of the following claims.

What is claimed is:

1. A system for providing power to a load, where the load is powered by a power source, the system comprising:
a flywheel system including a flywheel coupled to rotate with a motor/generator;
a passive rectifier coupled to the flywheel system for converting alternating current generated by the flywheel system to direct current;
an active inverter coupled to the passive rectifier for converting the direct current from the passive rectifier to alternating current and to output the alternating current to the load; and
a motor drive coupled to the motor/generator of the flywheel system for driving the motor/generator to rotate the flywheel, the motor drive including a second passive rectifier coupled to a second active inverter.

2. The system of claim 1, where the motor drive has a power rating that is less than a power rating of the passive rectifier and less than a power rating of the active inverter.

3. The system of claim 1, where a maximum power that the motor drive is configured to handle is less than the power of the power source.

4. The system of claim 1, where the motor drive is coupled to receive power from the power source.

5. The system of claim 4, where the motor drive is coupled to an alternating current bus of the power source that is configured for alternating current at a first frequency and the motor drive is configured to output alternating current at a second, variable frequency to the flywheel system.

6. The system of claim 5, where the active inverter is configured for a maximum switching frequency that is lower than a maximum switching frequency of the motor drive.

7. The system of claim 1, where the motor/generator includes a winding coupled to the motor drive for driving the motor/generator and coupled to the passive rectifier for providing power to the passive rectifier.

8. The system of claim 1, where a voltage associated with an output of the flywheel system varies based on a rotational speed of the motor/generator and the passive rectifier is coupled to receive the variable voltage output from the flywheel system.

9. The system of claim 1, where the power source is a three-phase power grid and the active inverter is configured to output alternating current having a frequency of the alternating current on the power grid.

10. The system of claim 1, wherein the motor/generator comprises a rotor having permanent magnets.

11. A method, comprising:
supplying alternating current to a flywheel system to charge a flywheel in the flywheel system, the alternating current supplied from a motor drive coupled to the flywheel system, where the motor drive includes a second passive rectifier coupled to a second active inverter;
outputting alternating current from the flywheel system to a passive rectifier during a discharge phase of the flywheel, the passive rectifier coupled to the flywheel system;
converting the alternating current from the flywheel system to direct current at the passive rectifier;
converting the direct current from the passive rectifier to alternating current at an active inverter coupled to the passive rectifier;
supplying a load with the alternating current from the active inverter.

12. The method of claim 11, where supplying alternating current to a flywheel system comprises supplying alternating current to a flywheel system at a variable frequency where a highest frequency of the variable frequency is higher than a highest frequency that the active inverter is configured to supply.

13. The method of claim 11, where supplying a load with alternating current from an active inverter comprises supplying the load at a maximum power greater than a maximum power that the motor drive is configured to handle.

14. The method of claim 11, where the discharge phase of the flywheel is initiated in response to a change in quality of power supplied to the load by a power grid.

15. The method of claim 14, where the change in quality of power is a change in at least one of a frequency of the power supplied by the power grid, a power level of the power supplied by the power grid, a voltage of the power supplied by the power grid, or a phase associated with the power supplied by the power grid.

16. A flywheel interface system for line interactive power correction, the system comprising:
a flywheel system including a flywheel coupled to rotate with a permanent magnet motor/generator;
a passive rectifier coupled to the flywheel system for converting alternating current from the flywheel system to direct current, the passive rectifier associated with a first power rating;
an active inverter coupled to the passive rectifier for converting the direct current from the passive rectifier to alternating current, the alternating current to be supplied to a load, the active inverter associated with a second power rating; and
a motor drive coupled to the motor/generator of the flywheel system for driving the motor/generator to rotate the flywheel, the motor drive including a second passive rectifier coupled to a second active inverter, the motor drive associated with a third power rating less than the first or second power rating.

17. The flywheel interface system of claim 15, where the third power rating is less than half the first or second power rating.

18. The flywheel interface system of claim 15, where a voltage output by the flywheel system varies based on a rotational speed of the motor/generator and the passive rectifier is coupled to the flywheel system to receive the varying voltage and output direct current that varies based on the varying voltage received by the passive rectifier.

19. The flywheel interface system of claim 17, where the output of the flywheel system is converted into an alternating current by the passive rectifier in combination with the active inverter, the alternating current having a frequency substantially similar to a frequency associated with a previous alternating current of a power grid used to supply power to the load.

* * * * *